United States Patent [19]

Napoli

[11] 3,735,267

[45] May 22, 1973

[54] BALANCED MIXER

[75] Inventor: Louis Sebastian Napoli, Hamilton Square, N.J.

[73] Assignee: RCA Corporation, New York, N.Y.

[22] Filed: July 23, 1971

[21] Appl. No.: 165,490

[52] U.S. Cl. .................................. 325/446, 333/24.1

[51] Int. Cl. .........H01p 1/32, H01p 3/08, H04b 1/26

[58] Field of Search ......................325/446; 333/24.1

[56] References Cited

UNITED STATES PATENTS

| | | | |
|---|---|---|---|
| 3,659,206 | 4/1972 | Hallford | 325/446 |
| 3,560,893 | 2/1971 | Wen | 333/024.1 |
| 3,652,941 | 3/1972 | Neuf | 325/446 |
| 3,437,935 | 4/1969 | Webb | 325/446 |

*Primary Examiner*—Howard W. Britton

*Attorney*—Edward J. Norton

[57] ABSTRACT

Coplanar and slot transmission lines are used to provide an improved microwave balanced mixer.

5 Claims, 2 Drawing Figures

INVENTOR.
Louis S. Napoli
BY
Edward J. Norton
ATTORNEY

BALANCED MIXER

DESCRIPTION OF THE PRIOR ART

The design theory of balanced intermediate frequency (I.F.) mixers has been described in the book "Microwave Mixers" by R. V. Pound and in numerous technical articles. For those applications of balance mixers where small physical size and microwave integrated circuit techniques are desirable, the techniques of microstrip transmission line have been used. The microstrip balanced I.F. mixers have a ground conductor on one surface of a dielectric substrate and a complex conductive circuit composed of strip like conductors adjacent to the opposite dielectric surface. Usually, the conductive circuitry consists of a 3 db directional coupler having two input ports and two output ports. A signal at a frequency $f_1$ is coupled to the first input port and a signal at a frequency $f_2$ is coupled to the second input port. At each of the two output arms of the directional coupler, a non-linear microwave diode is coupled to the ground conductor. Both of the applied signals are coupled to each diode. One of the resulting signals generated by the diode is at a frequency $f_3$ which is the difference between $f_2$ and $f_1$. The resulting signal at the frequency $f_3$ is transmitted through a low pass filter which excludes the transmission of signals at the frequencies $f_1$ and $f_2$. One of the physical problems encountered with microstrip transmission line mixers is the inconvenience of the ground plane for shunt coupling the diodes to ground. In contrast, coplanar and slot transmission lines have the ground plane on the same surface as the conductive circuitry and thus facilitate the shunt connection to ground of the diodes.

Another problem is the physical realization of an effective microstrip low pass filter composed of a series combination of a low impedance microstrip transmission line and a high impedance microstrip transmission line. The magnitude of characteristic impedance for microstrip transmission line is dependent on the width of the strip like conductor. As the width of the strip like conductor increases, everything else remaining constant, the characteristic impedance of this conductor decreases. However, at higher microwave frequencies the width of the low impedance conductors approach an undesirable resonant fraction of a wavelength.

The coplanar and slot transmission line modes of microwave propagation offer a solution to these problems. Coplanar transmission line has been described by C. P. Wen in his U.S. Pat. No. 3,560,893 issued Feb. 2, 1971, and entitled "Surface Strip Transmission Line and Microwave Devices Using Same". Slot line transmission line has been described by Elio A. Mariani et al. in an article entitled "Slot Line Characteristics" published in the 1969 issue of the IEEE Transactions On Microwave Theory and Techniques, page 1091.

SUMMARY OF THE INVENTION

A balanced mixer is described which has all conductive surfaces adjacent to one side of a dielectric substrate. One element in the mixer is a directional coupler formed in coplanar transmission line. The coupler has first and second input terminals and first and second output terminals. Means are provided for coupling a first signal at a frequency $f_1$ to the first input terminal of the coupler and a second signal at a frequency $f_2$ to the second input terminal of the coupler. The anode of a first diode is coupled to the first output terminal of the coupler. The cathode of the first diode is coupled to an input terminal of a low pass filter circuit. The cathode of a second diode is coupled to the second output terminal of the coupler. The anode of the second diode is coupled to a second input terminal of the low pass filter circuit.

The low pass filter circuit has first and second shunt coupled low impedance slot transmission line sections. Each section has an input terminal at one end and is terminated by a relatively high microwave impedance at the other end. The electrical length of the slot transmission line sections of the filter is $\lambda 4$, where $\lambda$ is the slot transmission line wavelength at the frequency $f_1$. The diodes are of the type that generate a third signal at a frequency $f_3$ in response to the application of the first and second signals. Means are provided for coupling the third signal at a frequency $f_3$ from the low pass filter circuit.

DESCRIPTION OF THE PREFERRED EMBODIMENT

The microwave mixer is a component that uses a non-linear device to convert a microwave (R.F.) signal at a frequency $f_1$ to a signal at a different frequency $f_3$. An illustration of a device that has the requisite non-linear current versus voltage characteristic is a resistive microwave diode. The diode generates a signal containing many frequency components when a combination of a local oscillator (L.O.) signal, at a frequency $f_2$, and a microwave (R.F.) signal, at a frequency $f_1$, is applied to it. One type of mixer is the intermediate frequency (I.F.) mixer. In the I.F. mixer, the frequency, $f_3$, of the output signal can be the difference between the R.F. and L.O. frequencies.

Figure 1:
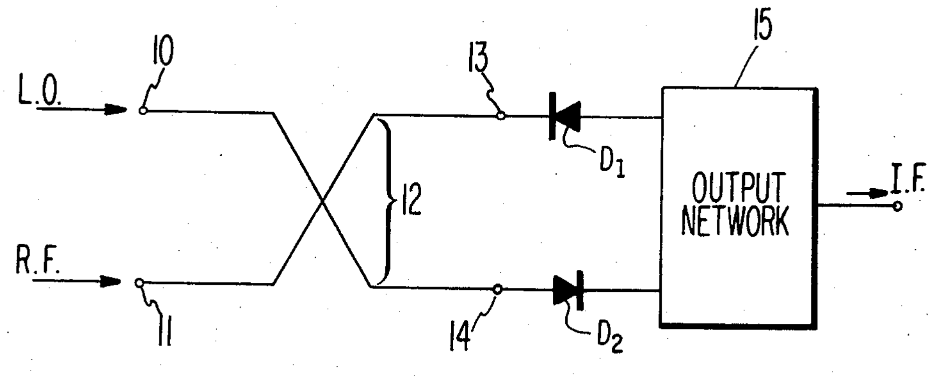
FIG. 1 is a schematic of a balanced mixer circuit.

Referring to FIG. 1, there is shown a schematic of a balanced I.F. mixer. The microwave energy of a signal coupled to an input port 10, 11 of the 3 db directional coupler 12 is transmitted in equal power levels to the output ports 13, 14 of the coupler 12. The coupler 12 also provides microwave isolation between its input ports 10, 11. Thus, if a L.O. signal at frequency $f_2$ is coupled to one input port 10 and a R.F. signal at a frequency $f_1$ is coupled to a second input port 11, both signals are present at each of the output ports 13, 14. A resistive microwave diode $D_1$, $D_2$ is series coupled between each output port 13, 14 and the output network 15. Each diode $D_1$, $D_2$ will mix or combine the L.O. and R.F. signals and generate an I.F. signal at a frequency $f_3$. The relative phase difference between the two I.F. signals is 180°. Therefore, one method for combining the I.F. signals generated by each of the diodes $D_1$, $D_2$ is to couple one diode between the coupler 12 and output network in opposite polarity to the other diode. The output network is a filtering circuit that is designed to propagate only the desired I.F. frequency $f_3$.

Figure 2:
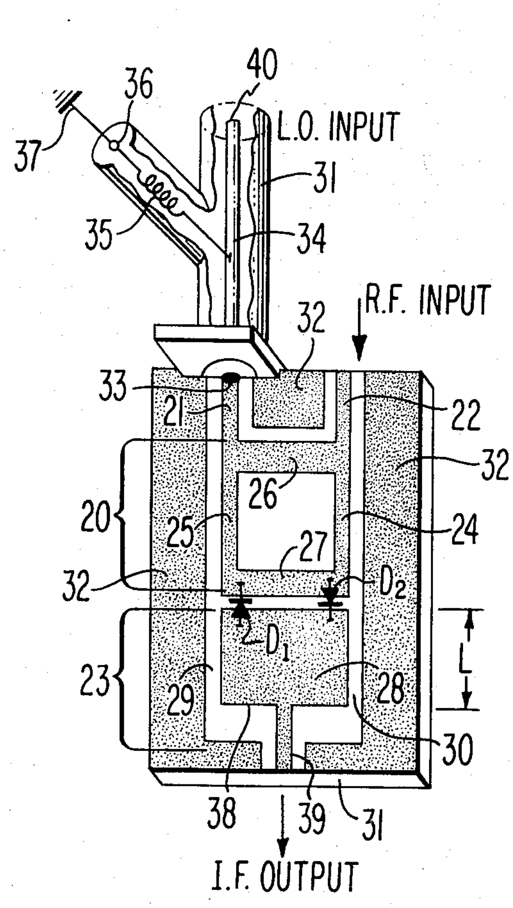
FIG. 2 is the top view of a dielectric substrate having a balanced mixer formed by a combination of coplanar and slot transmission lines according to one embodiment of the invention.

Referring to FIG. 2, there is shown a balanced mixer having all elements on one surface of a dielectric substrate 31. The passive elements of the balanced mixer are formed by thin strip like conductors that transmit microwave energy along predetermined paths. Some of the strip like conductors are ground conductors 32 and others form a branch line coupler 20 and a low pass filter circuit 23. The physical dimensions of the branch line coupler 20 are determined by the techniques of a coplanar transmission line. Slot transmission line techniques are used to determine the physical dimensions of the low pass filter circuit 23. The low pass filter circuit 23 is an effective short circuit at microwave frequencies and a good transmission line at the I.F. frequency, $f_3$. Coplanar transmission line has been described by C. P. Wen in his U.S. Pat. No. 3,560,893 issued Feb. 2, 1971, and entitled "Surface Strip Transmission Line and Microwave Devices Using Same". Slot transmission line has been described by Elio A. Mariani et al. in an article entitled "Slot Line Characteristics" published in the 1969 issue of the IEEE Transactions On Microwave Theory and Techniques, page 1091.

Coplanar transmission line is a means for transmitting microwave energy in a quasi-Transverse Electromagnetic Mode of propagation. Coplanar transmission line consists of a narrow strip like center conductor deposited on one surface of a dielectric substrate between two wide strip like ground conductors. All conductors are coplanar and parallel to each other. Microwave energy is transmitted along the slot separating the center conductor from the ground conductors when there is a difference in potential between the center conductor and the ground conductors. The electric field of a microwave signal is between the narrow center conducting strip and the ground conductors. The electric field produces a discontinuity in the displacement current density on the conducting strips and at relatively high frequencies this induces microwave magnetic fields in the same plane and on the same dielectric surface having the conducting strips. A relatively wide ground conductor separated by a narrow gap from a single strip like conductor having a relatively narrow width is analyzed as a modified coplanar transmission line. The characteristic impedance of coplanar transmission line is primarily dependent upon the magnitude of the dielectric constant, the width of the center strip and the separation between the ground conductors and the center strip.

Slot transmission line consists of a narrow slot or gap between two relatively wide strip like conductors on one surface of a dielectric slab. Microwave energy is transmitted along the slot separating dielectric strip like conductors when there is a difference in potential between the two strip like conductors. The electric field of a microwave signal extends across the slot, while at relatively high microwave frequencies, the magnetic field is in a plane perpendicular to the slot. The characteristic impedance of slot transmission line is primarily dependent upon the magnitude of the dielectric constant, the thickness of the dielectric substrate, the width of the narrow slot and the frequency of operation. Both slot transmission line and coplanar transmission line propagate microwave energy along a slot separating two strip like conductors on one surface of a dielectric substrate. In both slot transmission line and coplanar transmission line, the width of the ground conductor is relatively wide. The electrical characteristics of coplanar transmission line changes when the width of the non-ground conductor becomes sufficiently wide enough to support the slot line mode of microwave transmission.

The characteristic impedance of the coplanar transmission line forming the input terminals 21, 22 and the main transmission arms 24, 25 of the branch line coupler 20 is 50 ohms. The characteristic impedance of the coplanar transmission line forming the branch arms 26, 27 of the branch line coupler is 35 ohms. The electrical length of all arms of the branch line coupler 20 is substantially $\lambda/4$, where $\lambda$ is the wavelength in coplanar transmission line at the R.F. frequency of operation. The characteristic impedance of coplanar transmission line can be determined from curves contained in an article entitled "Coplanar Waveguide: A Surface Strip Transmission Line Suitable for Nonreciprocal Gyromagnetic Device Applications" by C. P. Wen. The article was published by the IEEE Transactions On Microwave Theory and Techniques, Vol. MTT–17, No. 12, December 1969, page 1087.

Two non-linear microwave diodes, $D_1$, and $D_2$, are coupled from one of the branch arms 27 of the coupler 20 to the low pass filter 23. A terminal of each diode, $D_1$, $D_2$, is coupled to the intersection of the branch arm 27 with a main transmission arm 24, 25 and are thus separated from each other by an electrical length of substantially $\lambda/4$. $\lambda$ is the coplanar wavelength at the R.F. input frequency. The second terminal of each diode is coupled to the first element 28 of the low pass filter 23. The polarity of one of the diodes is reversed with respect to the other diode in order to combine, in phase, the diode generated I.F. frequency. The first element of the low pass filter 23 is a low impedance strip like conductor 28 forming a slot transmission line with the ground conductors 32. The conductor 28 has an electrical length, L, of $\lambda/4$, where $\lambda$ is the slot transmission line wavelength at the R.F. input frequency. The length, L, of the first low pass filter element 28 is measured from where the diodes $D_1$, $D_2$ are coupled to the end 38 at which the element 28 is terminated by a relatively high microwave impedance. The relatively high microwave impedance is formed by the relatively wide gap between the end of the first low pass filter element 28 and the ground conductor 32. A relatively high impedance terminating one end of a microwave transmission line establishes an effective microwave short circuit at a length $\lambda/4$ from the terminated end. Therefore, the first element 28 of the low pass filter 23 is an effective microwave short circuit at the R.F. frequency, $f_1$, and is the effective ground conductor for the second coplanar branch arm 27 of the coupler 20. The gap separating the second branch arm 27 and the first low pass filter element 28 is critical in the determination of the branch arm characteristic impedance.

The width of the first low pass filter element 28 is much wider than the conductive elements of the branch line coupler. The electrical effect is that the boundary conditions establishing coplanar transmission line are no longer present. Thus, the techniques of slot transmission line are used in the calculation of the characteristic impedance of the first low pass filter element 28. The impedance of the first low pass filter element 28 is the parallel combination of the slot lines formed by the narrow slots 29, 30 on either side of the first low pass filter element 28 and the ground conductors 32. The magnitude of the impedance of the parallel slot lines is designed to be relatively low. A combination of a low impedance transmission line in series with a relatively high impedance transmission line is an effective low pass filter that prevents the transmission of energy over a relatively wide band of microwave frequencies. Therefore a second low pass filter element 39 may be added in series with the first low pass filter element 28. The second output element 39 of the low pass filter 23 is a high impedance coplanar transmission line.

The signal generated by the mixer diodes $D_1$, $D_2$, contains a D.C. component. One method of providing the necessary path to ground for the D.C. component is to use a coaxial bias tee 31 to transmit the L.O. signal to the mixer substrate. The coaxial bias tee 31 is a device that transmits a microwave signal from an input terminal 40 to an output terminal 33 along the center conductor 34 of a coaxial transmission line. The bias tee also has a high inductance lead 35 coupled from the coaxial center 34 conductor to a third terminal 36. The relatively high microwave impedance of the high inductance lead 35 prevents the transmission of microwave energy to the third terminal 36. However, when the third terminal 36 is terminated by a short circuit 37, the bias tee provides a path to ground for the D.C. component of the signals generated by the diodes $D_1$, $D_2$.

Although the balanced mixer has been illustrated only using a 3 db branch line coupler configuration and an I.F. return path external to the mixer circuit, it should be appreciated that other 3 db coupler configurations and methods for providing an I.F. return path can be used within the spirit and scope of the invention. While actual connections have not been shown for applying the R.F. signal to input terminal 22 and for deriving the output from the filter 23, such connections would be made using state of the art coaxial or other means as required by the particular application.

Thus, numerous and varied other arrangements can readily be devised in accordance with the disclosed principles by those skilled in the art.

What is claimed is:

1. A balanced mixer having all conductive surfaces adjacent to one side of a dielectric substrate, said mixer comprising:

a directional coupler formed in coplanar transmission line on said one side of said substrate, said coupler having first and second input terminals and first and second output terminals, means for coupling a first signal at a frequency $f_1$ to said first input terminal of said coupler, means for coupling a second signal at a frequency $f_2$ to said second input terminal of said coupler, a resonant low pass filter circuit having first and second shunt coupled on said one side of said substrate, relatively low impedance, slot transmission line sections, each section having an electrical length of substantially $\lambda/4$ and terminated at one end by an input terminal and at an opposite end in a way to provide an effective microwave short circuit at said frequency $f_1$ at said input terminal, where $\lambda$ is the slot transmission line wavelength at said frequency $f_1$, said low pass filter circuit being a reflective impedance at said frequencies $f_1$ and $f_2$, said sections being configured on said one side of said substrate to complete said coplanar transmission line coupler on said one side so that said coplanar line and said slot line sections are integrated one with the other, a first diode having an anode coupled to said first output terminal of said coupler and a cathode coupled to said input terminal of said first section of said low pass filter, a second diode having a cathode coupled to said second output terminal of said coupler and an anode coupled to said input terminal of said second section of said low pass filter, said first and second diodes being of the type to generate a third signal at a frequency $f_3$ in response to the application of said first and second signals, and means for coupling said third signal at a frequency $f_3$ from said low pass filter.

2. The balanced mixer according to claim 1, wherein said coplanar transmission line coupler adjacent to one surface of a dielectric substrate includes a branch line coupler having one end of first and second relatively narrow strip like conductors coupled together by the ends of a third relatively narrow strip like conductor, the other ends of said first and second conductors being coupled together by the ends of a fourth relatively narrow strip like conductor, said first strip like conductor being parallel to and separated on one entire side from a relatively wide ground conductor by a gap forming a coplanar transmission line having a characteristic impedance of 35 ohms, said second strip like conductor being parallel to and separated on one entire side from said one end of said low pass filter circuit by a gap forming a coplanar transmission line having a characteristic impedance of 35 ohms, said third and fourth strip like conductors being parallel to and separated on one entire side from relatively wide ground conductors by gaps forming third and fourth coplanar transmission lines having characteristic impedances of 50 ohms, all of said narrow strip like conductors having an electrical length of substantially $\lambda/4$, where $\lambda$ is the wavelength in coplanar transmission line at said frequency $f_1$.

3. The balanced mixer according to claim 1, wherein said means for coupling said first and second signals to said first and second input terminals of said coupler include a first strip like input conductor coupled to the intersection of said first and third conductors, a second strip like input conductor coupled to the intersection of said first and fourth conductors, said first and second input conductors being parallel to and separated on both sides from a relatively wide ground conductor by gaps forming coplanar transmission lines having a characteristic impedance of 50 ohms.

4. The balanced mixer according to claim 1, wherein said means for coupling said third signal from said low pass filter include a narrow strip like conductor adjacent to said one dielectric substrate surface coupled to the center of said opposite end of said low pass filter, said narrow strip like conductor having a relatively high characteristic impedance in coplanar transmission line formed by gaps separating both sides of said narrow conductor from relatively wide strip like ground conductors.

5. A balanced mixer comprising, a coplanar transmission line directional coupler having first and second input terminals for the application thereto of signals and first and second output terminals, said coplanar line being comprised of narrow conductors spaced from wider ground conductors, a slot transmission line low pass filter comprised of a further conductor wider than said narrow conductors spaced from said ground conductors with said further conductor being spaced from one of said narrow conductors to complete said coplanar transmission line;

a first diode connected in one polarity between said first output terminal and said filter, a second diode connected in reverse polarity between said second output terminal and said filter, and means for deriving an output signal from said filter.

* * * * *